United States Patent
Childers et al.

(10) Patent No.: US 6,648,980 B2
(45) Date of Patent: Nov. 18, 2003

(54) CLEANING MECHANISM FOR FIBER OPTIC CONNECTORS

(75) Inventors: Darrell R. Childers, Hickory, NC (US); Jeffrey R. Elledge, Hickory, NC (US); Timothy S. Laws, Hickory, NC (US); A. John McDonald, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/116,920

(22) Filed: Apr. 5, 2002

(65) Prior Publication Data

US 2002/0108636 A1 Aug. 15, 2002

Related U.S. Application Data

(62) Division of application No. 09/343,283, filed on Jun. 30, 1999, now Pat. No. 6,415,471.

(51) Int. Cl.[7] .............................. B08B 7/00; A47K 7/02
(52) U.S. Cl. ........................... 134/6; 139/9; 15/210.1; 15/97.1
(58) Field of Search ................... 134/6, 9, 42; 15/210.1, 15/97.1, 104.001, 238, 236.05, 236.06, 236.08, 236.09

(56) References Cited

U.S. PATENT DOCUMENTS

| | | | |
|---|---|---|---|
| 1,595,950 A | 8/1926 | Kirsner | 15/210.1 |
| 4,086,678 A | 5/1978 | Torr | 15/105 |
| 4,121,316 A | 10/1978 | Perry | 15/104.08 |
| 4,436,366 A | 3/1984 | Abramson | 350/96.2 |
| 5,117,528 A | 6/1992 | Kanayama et al. | 15/210.1 |
| 5,220,703 A | 6/1993 | Kanayama et al. | 15/210.1 |
| 5,312,197 A | 5/1994 | Abramson | 15/210.1 |
| 5,768,738 A | 6/1998 | Lee | 15/210.1 |
| 5,813,081 A * | 9/1998 | Wang et al. | 15/210.1 |
| 6,053,985 A | 4/2000 | Cheswick et al. | 15/210.1 |
| 6,209,162 B1 * | 4/2001 | Clairadin et al. | 15/97.1 |
| 6,449,795 B1 * | 9/2002 | Sato | 15/210.1 |
| 6,466,723 B2 * | 10/2002 | Miyake et al. | 385/134 |

FOREIGN PATENT DOCUMENTS

| | | | |
|---|---|---|---|
| CH | 684322 A | 8/1994 | B24B/7/24 |
| JP | 60-135911 | 7/1985 | G02B/6/36 |
| WO | WO97/31753 | 9/1997 | B24B/19/00 |

OTHER PUBLICATIONS

US 6,029,305, 2/2000, Lauer (withdrawn).
Abstract of Japan, 60135911, Jul. 19, 1985.

* cited by examiner

Primary Examiner—Randy Gulakowski
Assistant Examiner—Saeed Chaudhry

(57) ABSTRACT

A device for cleaning the polished end faces of fibers of an optical connector having guide pins is provided. The device has a surface with at least one rail disposed on the surface. The rail has a height above the surface sufficient to accommodate guide pins extending from an optical connector. A system for cleaning the polished end faces of fibers of an optical connector is also provided that includes an overlay disposed on the cleaning device. A guide member that is disposed on top of the overlay is also provided for receiving the optical connector. A method for cleaning an optical connector with the disclosed device and system is also provided.

10 Claims, 5 Drawing Sheets

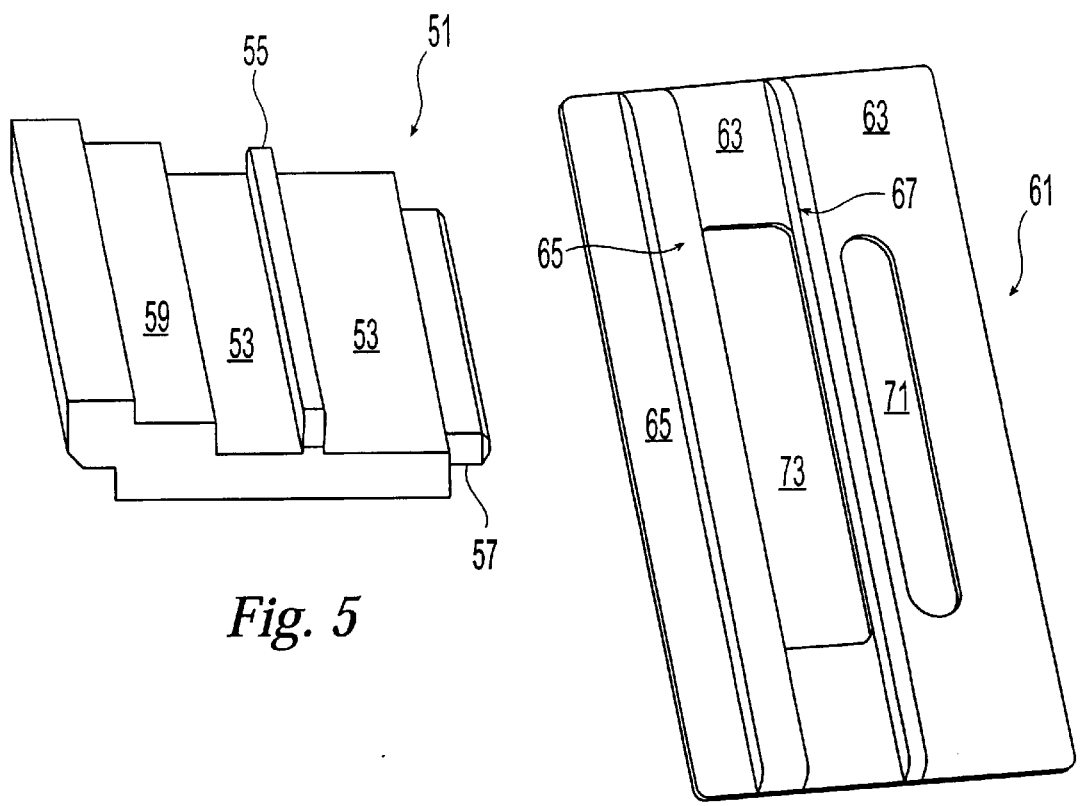
Fig. 5
Fig. 6
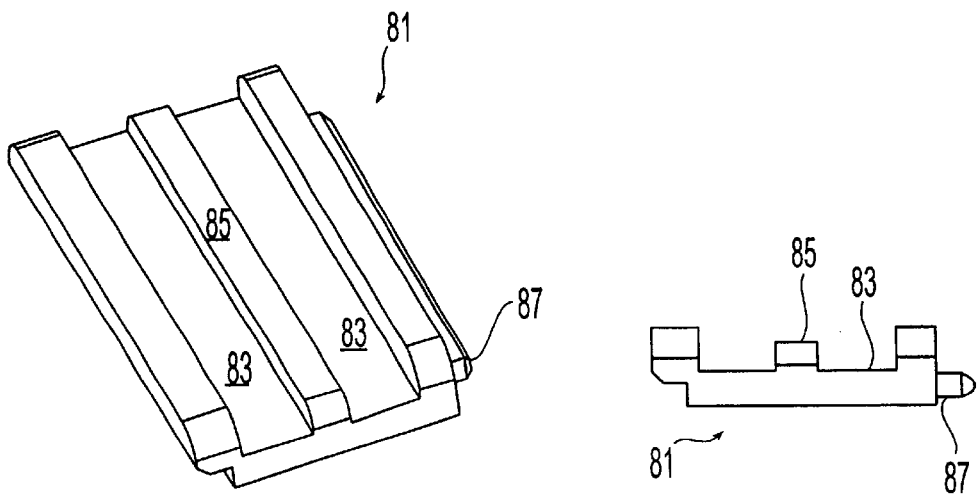
Fig. 7
Fig. 8

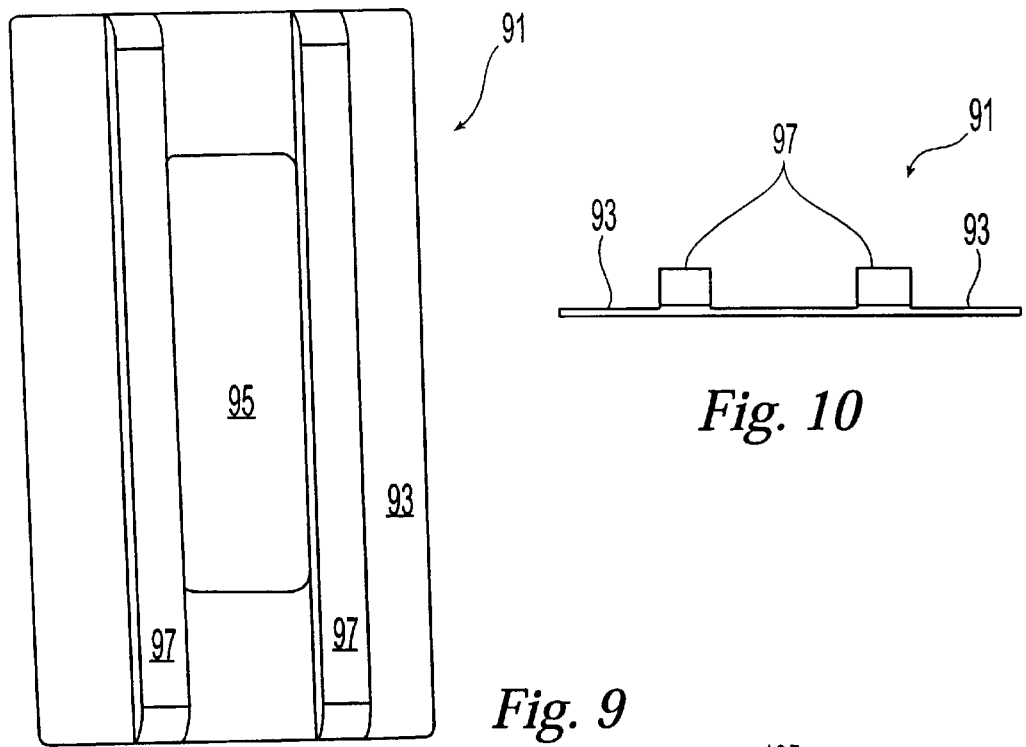
Fig. 9
Fig. 10
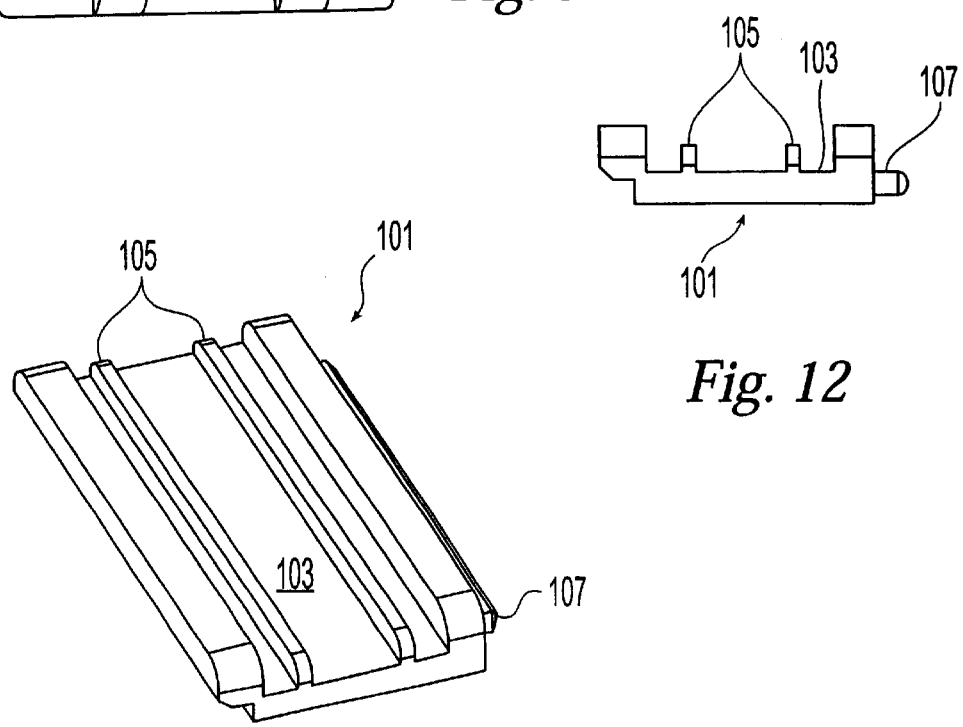
Fig. 11
Fig. 12

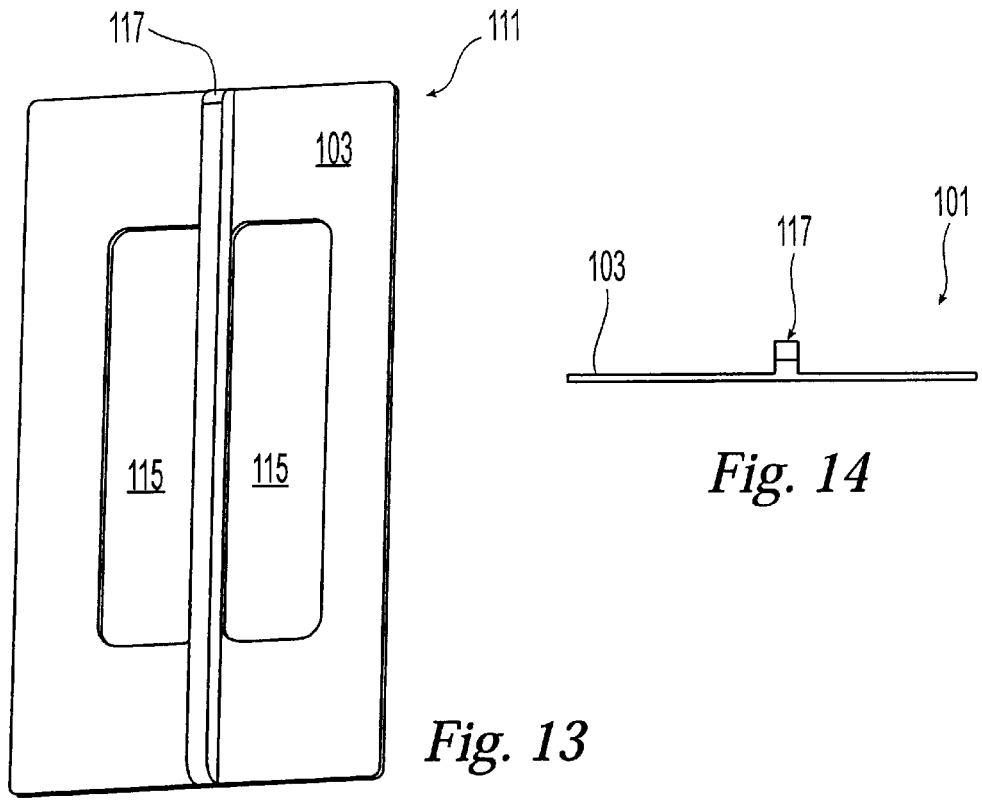
Fig. 13
Fig. 14
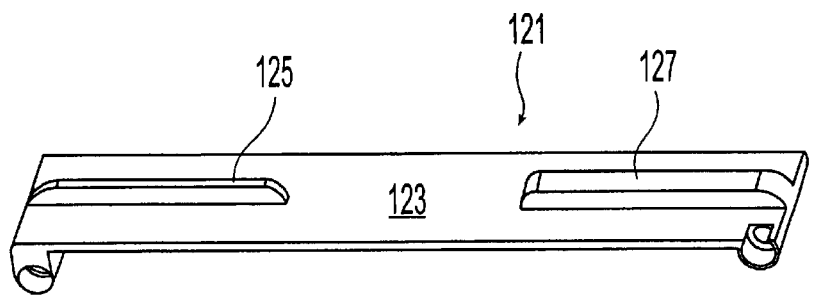
Fig. 15
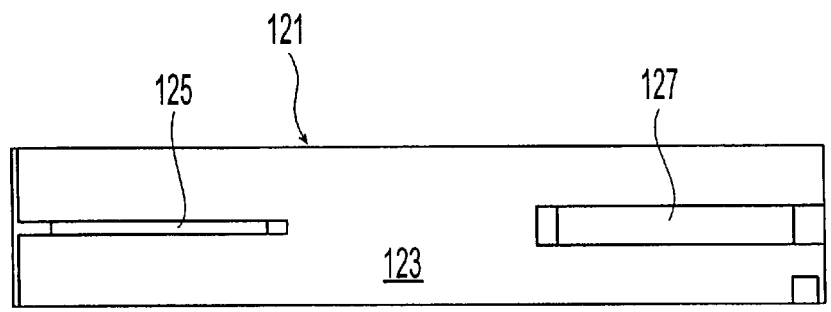
Fig. 16

CLEANING MECHANISM FOR FIBER OPTIC CONNECTORS

This application is a divisional application of Ser. No. 09/343,283, now U.S. Pat. No. 6,415,471.

FIELD OF THE INVENTION

This invention relates generally to methods and apparatus for the cleaning of connectors utilized in connecting optical fibers. The method and apparatus may be advantageously utilized to clean single fiber and multifibers connectors.

BACKGROUND OF THE INVENTION

The use of optical fiber for transmitting information, such as data or voice communications, is increasing. Optical fiber offers advantages over traditional wire due, for example, to the improved transmission speed and larger information capacity for the same sized cable.

Connectors are used to terminate and couple one or more optical fibers to other optical fibers or to other terminals. These connectors typically are divided into classes depending on the number of optical fibers terminated within the connector. For example, classes include connectors for a single optical fiber, for two optical fibers, and for more than two optical fibers (usually in multiples of two). Connectors for two or more optical fibers, referred to herein as "multi-fiber connectors." are desirable since they allow simultaneous transmission and reception of information.

Such connectors include configurations that generally define the positioning of the one or more optical fibers within the connector, as well as the structure for securing the connector to other connectors or terminals. For example, a number of different types of connectors for a single optical fiber include SC, FC, ST®, and D4 connectors. Similarly, a number of different types of connectors for two optical fibers include the MT, MTP, and MT-RJ connectors, as well as the UNICAM® and SC-DC™ connectors produced by the assignee of the present invention.

Various types of the aforementioned connectors have been used to join optical fibers in a network communication system. Connection capabilities, however, can be significantly degraded by contamination of the connection interface by dirt, oil, or other foreign matter that interferes with the optical connection.

It is therefore advantageous to clean the polished end faces of optical connectors before the connection is made. Conventionally, the polished end face of an optical connector is wiped with a soft cloth or paper before the connection is made. Another method involves applying ethanol to the cleaning cloth or paper and then using a compressed gas, such as a fluorocarbon gas, to remove the remaining ethanol and dust from the cloth or paper from the connection surface.

U.S. Pat. No. 5,117,528, the disclosure of which is incorporated herein by reference, discloses an apparatus for cleaning the surface of optical connectors. In one embodiment disclosed in U.S. Pat. No. 5,117,528, a cleaning cloth is disposed on a roll inside of a mechanism that passes the cleaning cloth between a guide for receiving the housing of an optical connector disposed above the cleaning cloth and a lower plate against which the optical connector is pressed. The used cleaning cloth is stored on a take-up reel. In accordance with this embodiment disclosed in the patent, clean cloth is thereby made available for cleaning optical connectors.

The methods known in the prior art however, have dealt mainly with cleaning optical connectors in which the optical fiber is exposed at the end of the connector. Because the fiber is accessible, it is easily wiped off with a cloth. However, developments in multi-fiber communications systems have given rise to a number of multifiber connectors. Some of these multifiber connectors have one or more guide pins that serve to orient the connector so that the fibers are properly aligned. A number of connectors have multiple guide pins that extend beyond the surface of the optical fibers. For example, the MTP and the MT-RJ connectors, which are used extensively in fiber optic networks, have two guide pins that extend beyond the surface of the optical fibers making it difficult to adequately clean the surface of the optical fibers without bending or otherwise damaging the guide pins.

Due to the inadequacies of the present devices and methods for cleaning optical connectors with guide pins, there is a particular need for apparatus and methods that allow efficient and thorough cleaning of the surface of the optical fibers without damaging the guide pins extending from the optical connector. The invention disclosed herein provides an apparatus that overcomes the deficiencies of the prior art in this regard. The apparatus of the present invention also provides additional advantages described below.

SUMMARY OF THE INVENTION

The present invention provides cleaning apparatus advantageously well suited for the cleaning of optical fibers and optical fiber connectors. The apparatus may be utilized to clean the polished end faces of a ferrule mounted on the end of an optical fiber and the mating surfaces of a connector to minimize contamination of a connection interface between fibers or connectors by dirt, oil, or other foreign matter that interferes with the optical connection.

In one aspect, the present invention provides a device that may be utilized in a system for cleaning the polished end face of an optical connector. The device is particularly well suited for cleaning connectors having one or more guide pins. According to this aspect of the present invention, the device includes a plate for receiving an optical connector. The plate has a top surface with at least one rail disposed on the top surface. The rail extends upward from the surface and has a height above the surface sufficient to accommodate guide pins extending from an optical connector. An overlay is placed on the device and the optical connector placed into contact with the overlay such that any guide pins attached to the optical connector are received on either side of the rail beneath the overlay.

In a second aspect, the present invention provides a guide member having a surface with at least one opening for receiving the housing of an optical connector. The guide member may also have one or more rails extending downward from its lower surface. The guide member is disposed on top of the overlay such that the opening of the guide member is substantially centered around a rail disposed on the device.

A third aspect of the present invention provides a method for cleaning the polished end faces of an optical connector having one or more guide pins. The method includes the steps of contacting the optical connector to an overlay disposed on a device that includes a plate having a top surface with at least one rail disposed on the surface. The connector is placed into contact with the overlay such that any guide pins attached to the optical connector are received on either side of the rail beneath the overlay. The optical connector may then be moved along at least a portion of the rail thereby further cleaning the polished end faces of the fibers of the optical connector on the overlay.

A fourth aspect of the present invention provides a method for cleaning the polished end faces of fibers of an optical connector having one or more guide pins. The method includes placing the optical connector through a guide member formed to receive the housing of the optical connector and that is disposed on top of an overlay such that the opening of the guide is substantially centered around a rail on a plate below the overlay. The optical connector is then contacted to an overlay disposed on a device that includes a plate having a top surface with at least one rail disposed on the surface. The connector is placed into contact with the overlay such that any guide pins attached to the optical connector are received on either side of the rail beneath the overlay. The optical connector may then be moved along at least a portion of the rail thereby further cleaning the polished end face of the optical connector on the overlay.

In a fifth aspect, the present invention provides a device for cleaning the polished end face of an optical connector having one or more guide pins that may be used in an apparatus such as the one disclosed in U.S. Pat. No. 5,117,528. The device includes an insert for receiving an optical connector. The insert has a surface with a rail extending upward from the surface to a height sufficient to accommodate the guide pins of an optical connector. An overlay is then disposed on the insert.

In a sixth aspect, the present invention provides an apparatus that further includes a guide member having a surface with at least one opening for receiving an optical connector. The guide member may include a rail extending downward from the surface that may contact the overlay. The guide member is disposed on top of the overlay such that the opening of the guide member is substantially centered around the rail of the insert.

A seventh aspect of the present invention includes a method for cleaning the polished end faces of fibers of an optical connector that includes advancing a sheet of overlay disposed on a roll such that a segment of said overlay is located on a surface with at least one rail disposed on said surface. The rail has a height above the surface sufficient to accommodate guide pins extending from the optical connector. The optical connector is then contacted to the overlay. After contact, the optical connector may be removed from contact with the overlay. It is also contemplated that after the connector is contacted to the overlay, the connector may be moved along the rail while the optical connector is in contact with the overlay.

In an eighth aspect of the present invention, the optical connector is placed into a guide member with at least one opening for receiving said optical connector on top of said overlay. It is contemplated that the guide member will be disposed such that the opening of the guide member is substantially centered around the rail disposed on the insert below.

Additional objects, aspects and advantages of the invention will become apparent to those skilled in the art upon reference to the preferred embodiments and the included drawings.

BRIEF DESCRIPTION OF THE DRAWINGS

FIG. 5 is a perspective view of the second embodiment of the present invention;

FIG. 6 is an perspective view a guide member to be used therewith;

FIG. 7 is a perspective view of a third embodiment of the present invention;

FIG. 8 is an elevational view thereof.

FIG. 9 is a perspective view of a guide member to be used therewith:

FIG. 10 is an elevational view thereof;

FIG. 11 is a perspective view of a fourth embodiment of the present invention;

FIG. 12 is an elevational view thereof.

FIG. 13 is a top view of a guide member to be used therewith:

FIG. 14 is an elevational view thereof;

FIG. 15 is a perspective view of a fifth embodiment of the present invention; and FIG. 16 is a top view thereof.

PREFERRED EMBODIMENTS OF THE INVENTION

In general, an apparatus according to the present invention is used in cleaning an optical connector having one or more guide pins. Although the apparatus can be used for cleaning optical connectors without guide pins, the invention specifically facilitates the cleaning of optical connectors that have guide pins protruding beyond the optical fibers. Such connectors include standard MTP and MT-RJ connectors.

Figure 1:
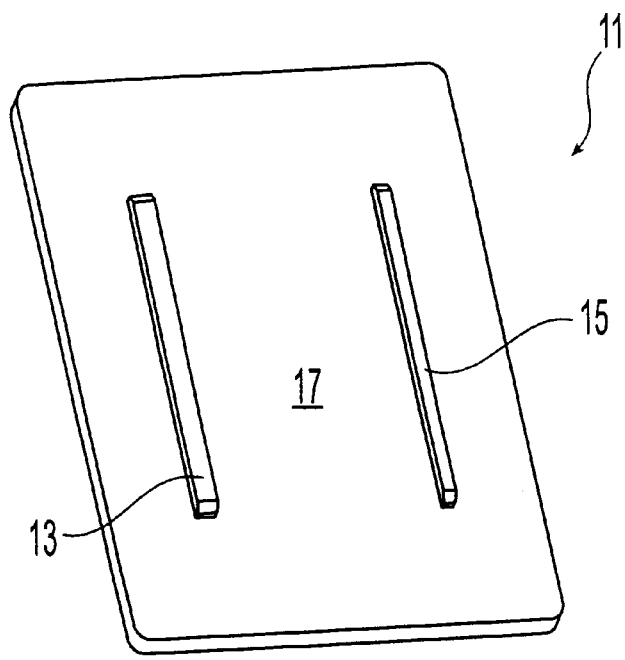
FIG. 1 is a perspective view of a first embodiment of the present invention.
Figure 2:
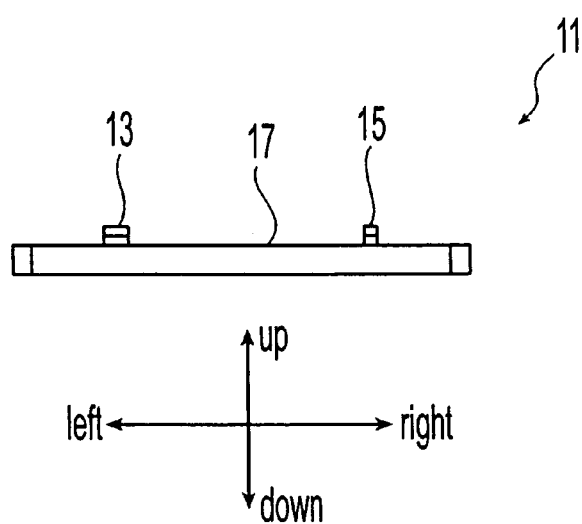
FIG. 2 is an elevational view thereof.

According to an embodiment of the present invention shown in FIGS. 1 and 2, one or more rails (13, 15) may be disposed on a plate (17). The rails (13, 15) extend upward from the plate (17) to a height above the surface of the plate (17) sufficient to accommodate the guide pins extending from the optical connector to be cleaned by the present invention. Because the rails (13, 15) extend upward from the surface of the plate (17), the rails (13, 15) will accommodate guide pins protruding from the optical connector. In the embodiment shown in FIGS. 1 and 2, the plate (17) defines a substantially planar surface, however, such a surface in not necessary for practice of the present invention. Any surface upon which a rail may be disposed of sufficient size to accommodate the guide pins of the optical connector to be cleaned beside the rail will suffice.

Although many different types of materials, for example plastics, metals, wood, etc., could be used to make the present invention, the preferred embodiment of the invention is manufactured from a material is manufactured from Delrin®, which is manufactured by DuPont Engineering Polymers of Wilmington, Del. It is also expected that the plate of the present invention could be fabricated from one material (including nylon or any other similar material), and that the rail could be formed from a separate material. In one embodiment, it is expected that the base may be made of a fairly rigid material and that the rail may be made of a soft or foam material, including an elastomer. Using a softer material, and more preferably a higher density soft material, allows the invention to use employ a rail having a greater width that the distance between the guide pins on a connector because the guide pins would compress the material and be maintained in contact with the softer material. In fact, the entire device may a base or a piece of a soft, pliable material with holes or slits to accommodate the pins of the connectors.

It should also be clearly understood that references to a rail disposed on a surface throughout this application does not limit the invention to embodiments where a rail is attached to a surface after the surface is formed or even simultaneously. It is expected that the rail may be an integral part of the lower surface, for example, where the invention described above is formed by cutting recesses on the surface of a solid piece of material in order to thereby form a rail from the solid piece of material. As a result, the recesses for the guide pins may only be as wide as or slightly wider than the guide pins, which would allow the solid piece of material to clean between the guide pins as well as on the outer edges of the connector.

Throughout this specification, all statements of direction (e.g., upward, downward, etc.) are referenced to the invention in a normal upright position wherein rails disposed on the top surface of a plate or an insert extend in an upward vertical direction, and rails disposed on the bottom surface of a guide member extend in a downward vertical direction. Examples of this normal upright position are shown in FIGS. 2 and 5. It will be appreciated, however, that the present invention may be used in many different orientations, even inverted, depending on the necessity of the situation. The stated directions will, of course, change as the orientation of the invention changes.

An overlay is placed on the device so that it covers the rails (13, 15) to be used to clean the optical connector. Without being limited thereto, it is preferable to use an overlay that provides cleaning properties sufficient to adequately clean the optical fibers without requiring additional cleaning solvents or drying agents. For example, it is believed that a nylon-based cleaning cloth less than about 0.1 denier will not require use of any other cleaning solvents such as ethanol or drying agents such as flone gas (a general term representative of fluorocarbon). A cloth sold under the name Toray MK Cloth, manufactured by Toray Industries, Inc., of Tokyo, Japan, is used in a preferred embodiment of the present invention. The overlay may also have an adhesive surface, to which any dirt on the ferrule adheres. The overlay is preferably of a shape that generally corresponds to the shape of the device, although any size and shape that covers the rails are also acceptable.

Although not shown, it is within the scope of the present invention to provide a fastening device to hold the overlay in place. Any type of fastening device or method that will hold the overlay in a substantially fixed position on the plate and rail will suffice. Although a fastening device may be used, it is not required for practicing this embodiment of the present invention. A person using this embodiment of the present invention may simply hold the overlay in place while cleaning an optical connector.

It is also expected that the present invention may be used without an overlay where a suitable surface of a rail is present. For example, certain types of foam materials may possess sufficient cleaning properties that a rail formed with the foam materials will not require an overlay.

After the overlay is placed over one or both of the rails (13, 15), the optical connector is placed into contact with the overlay and moved along the rail. The rails (13, 15) and the recess beside the rails (13, 15) accommodate the guide pins of the optical connector allowing the polished end face of the connectors to contact the overlay.

As shown in FIGS. 1 and 2, which illustrate one embodiment of the present invention, a single cleaning apparatus may include two rails of different widths that are designed to receive optical connectors having guide pins of varying dimensions. In the embodiment shown in FIGS. 1 and 2, one rail is of sufficient width to clean an MTP connector and a second rail is of sufficient width to clean an MT-RJ connector. Of course, the rail width and height may vary to accommodate specific types of connectors. In fact, the most basic cleaning apparatus need only have one rail that has a width smaller than the narrowest ferrule (the distance between the pins).

When referring to a rail of sufficient width to clean a particular connector, the thickness of the overlay is preferably taken into consideration in determining an appropriate width of the rail where an overlay is used. It is preferable to have good contact between the connector and overlay, and also between the overlay and rail. Although not shown, the invention contemplates the use of a single rail on a plate and further contemplates sufficient additional rails to clean any number of different types of optical connectors.

It should be understood that cleaning and absorption of fluids and dirt occurs on contact with the overlay. However, it is preferable to move the optical connector along the rail to improve the efficiency of the cleaning. Naturally, if the overlay uses an adhesive surface to clean the connectors, the connectors should not be and need not be moved along the rail to clean them.

Although this embodiment of the present invention is well suited to cleaning optical connectors with two guide pins, it should be clearly understood that the invention readily cleans optical connectors without guide pins and optical connectors with only one guide pin. In addition, the invention also contemplates cleaning a connector with more than two guide pins, although it might is some cases be necessary to contact and/or move the optical connector along the rail more than once in order to thoroughly clean a connector with more than two guide pins.

Figure 3:
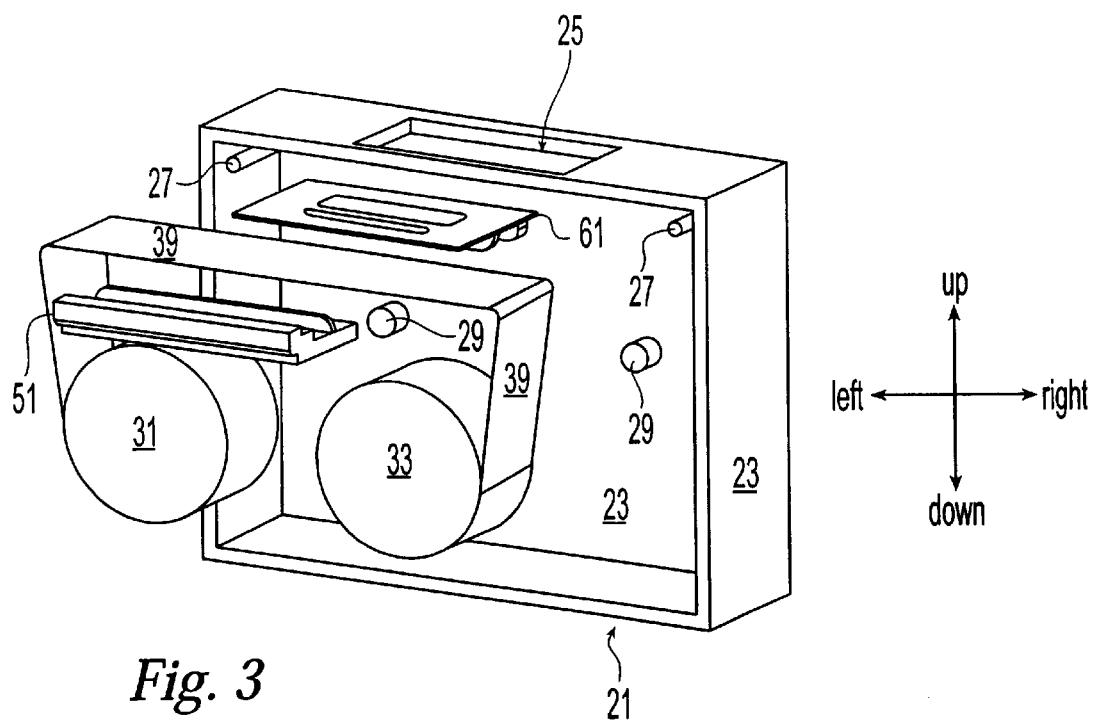
FIG. 3 is an exploded perspective view of an apparatus that is used with a second embodiment of the present invention.
Figure 4:
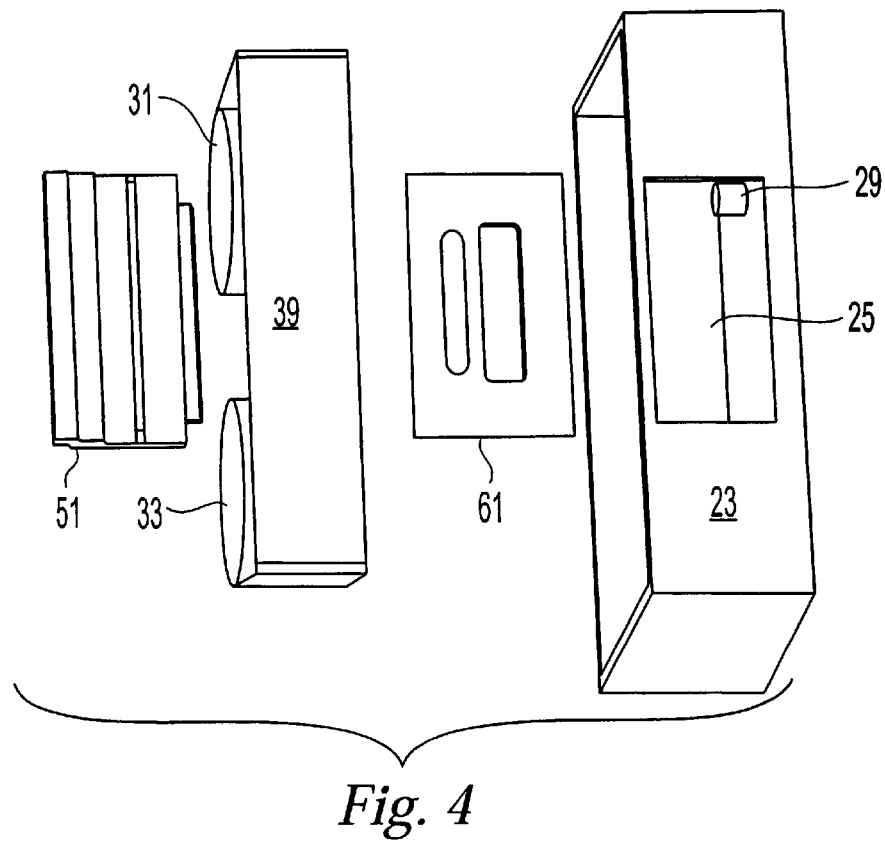
FIG. 4 is a top perspective view thereof.

Another embodiment of the present invention contemplates use of the invention in an apparatus designed to store a strip or roll of the overlay material and advance the material across the present invention that may be formed as an insert for the mechanism. FIGS. 3 and 4 show such an apparatus. Referring to FIGS. 3 and 4, apparatus 21 has a housing (23) to hold overlay material (39) on two reels (31, 33). The overlay material is stored on one reel (31), which travels around a support 27, under window 25 for cleaning of the connectors, over a second support 27, and is then taken up on a second reel 33. Although not shown, the overlay may be advanced by a wide variety of manual and automatic mechanisms known in the art. The plate located below the cleaning window in the mechanism disclosed in U.S. Pat. No. 5,117,528 may be removed and replaced with a new plate or with a different insert. The used overlay material is collected on a second roll until the roll is replaced. The cloth shift mechanism may be operated manually by the user or automatically by a motor. Additionally, the window (25) may be provided with a cover that is opened either automatically by a mechanism not shown or by a handle (41) attached to the cover. The cover aids in keeping the overlay material inside the apparatus clean.

The present invention may be formed as an insert (51) for the apparatus discussed above. FIG. 5 illustrates the configuration of the present invention that is the preferred embodiment. The insert (51) serves to receive optical connectors wherein the insert (51) has a surface (53) with a rail (55) disposed on the surface (53). The rail (55) extends upward from the surface (53) to a height above the surface (53) at least equal to the distance that guide pins extend from the optical connector to be cleaned. The rail thus accommodates the guide pins of the optical connector. The insert (51) is disposed below the overlay (39) so that the overlay covers at least a portion of the rail (55). Further, as shown in FIG. 4, the insert (51) can be formed to include a supporting edge (57) that will allow it to be incorporated into a slot for receiving the insert (51) that may be formed in the apparatus housing. Of course, the insert (51), can be designed to fit into other preexisting apparatus.

Once the overlay (39) is placed over the insert rail (55), an optical connector with guide pins can then be placed into contact with the overlay (39) such that the guide pins of the connector are disposed on either side of the rail. This permits the overlay (39) to contact the polished end face of the ferrule by pressing down against the top portion of the rail (55) of the insert (51).

In addition to the rail (55), which is well-suited for cleaning optical connectors with one or two guide pins, the insert (51) also has a surface (59) that is also well suited for cleaning optical connectors with no guide pins. Although a connector with no guide pins may be cleaned on a rail (55), it may in some cases be an advantage to have a different, and, in some cases, wider surface (59) on which to clean the pinless connector. Although in the preferred embodiment of the invention, the surface (59) is at a greater height above the bottom of the insert (51), in some applications it is expected that the surfaces (53, 59) may be at the same height.

In another embodiment of the present invention, a guide member (61) may be used in conjunction with the insert (51) to better align the optical connector over the rail (55) of the insert (51) or over the flat surface (59). FIG. 6 shows a guide member (61) configured for use with the insert (51) as shown in FIGS. 3 and 4. The guide member has a surface (63) with two openings (69, 71) for receiving the end of an optical connector. Opening (69) is well-suited for receiving optical connectors with one or more guide pins, whereas opening (71) is well-suited for receiving optical connectors without guide pins.

The guide member (61) is placed on top of the overlay (39) so that the rail (67) extending downward from the bottom surface (63) of the guide member (61) contacts the overlay (39). The rail (67) therefore improves the engagement between the overlay (39) and the insert rail (55). The insert rail (55) is placed in a position relative to the opening such that as the connector is placed into the guide member (61), the insert rail (55) is positioned in the appropriate position to clean the polished end face of the optical connector. In many cases, this will require the insert rail (55) to be substantially centered below the opening (69) of the guide member (61). Thus, when the optical connector is placed into the guide member (61), the opening (69) helps to position the connector housing over the rail (55) of the insert (51) below the overlay (39). The opening (69) also helps maintain the connector in the correct position relative to the insert rail (55) while the connector is moved across the rail (55).

Another embodiment of the present invention uses an insert and guide member adapted to clean a single type of connector. Referring to FIGS. 7 and 8, an insert is shown that may, for example, accommodate an MTP connector for cleaning. The insert (81) has a single rail (85) that extends above the upper surface (83) of the insert (81) below. The insert may also include a supporting edge (87) for mounting the insert into the apparatus (21).

FIGS. 9 and 10 illustrate a guide member (91) for use with insert (81) above. The guide member (91) has a single opening (95) and two rails that extend from the bottom surface (93) of the insert guide. The guide member (91) is placed on top of the overlay (39) so that the rails (97) extending downward from the bottom surface (93) of the guide member (61) contacts the overlay (39). The rails (97) therefore improve the engagement between the overlay (39) and the insert rail (85). As with the guide member discussed above, one edge of the body of the guide member (61) may be inserted into a pre-formed slot in the apparatus (21) to help support the guide member (91) and keep it in position.

As noted above, the insert rail (85) is placed in a position relative to the opening (95) such that when the connector is placed into the guide member (91), the insert rail (85) is positioned in the appropriate position to clean the end face of the fibers of the optical connector. In many cases, including the case of an insert guide to an MTP connector, this will require the insert rail (85) to be substantially centered below the opening (95) of the guide member (91). As above, when the optical connector is placed into the guide member (91), the opening (95) helps to position the connector housing over the rail (85) of the insert (81) below the overlay (39). The opening (95) also helps maintain the connector in the correct position relative to the insert rail (85) while the connector is moved across the rail (85). There should also be sufficient area between the side of the rail and the opening (95) to allow the connector to be oriented such that both pins are located on one side of the rail (85). This allows the operator to clean the peripheral edges of the connector as well, and not just the area between the guide pins.

Another embodiment of the present invention is well-suited to accommodate optical connectors of smaller sizes, such as MT-RJ connectors. For such smaller connectors, it is possible to have an insert and a guide member providing multiple cleaning rails on a single area of overlay under the window (25) of the apparatus (21). For example, insert (101) shown in FIGS. 11 and 12 has two rails (105) disposed on the surface (103). Because there are two rails disposed on the insert (101), it is possible to clean one connector on each of the two rails with a clean overlay surface without having to advance or replace the overlay material. It is of course also possible to clean a single connector twice, once on each of the two rails with a clean overlay surface without having to advance or replace the overlay material. Thus, this insert (101) allows use of two different portions of an exposed piece of overlay (39). Although certainly not necessary is all instances, it is sometimes desirable to use an unused section of overlay (39) for cleaning optical connectors. It should also be understood that after some number of uses, a section of overlay (39) will become too soiled to properly clean an optical connector. An advantage of the present configuration, however, is that it allows greater use of the surface of the cloth and, therefore, more use of a given section of the cloth. This arrangement allows for the simultaneous cleaning of a duplex connector, provided the rails 105 are sufficiently spaced.

FIGS. 13 and 14 show a guide member (111) for use with the insert (101) described above. The guide member has two openings (115) that may receive optical connectors and a single rail (17) extending downward from the bottom surface (103) of the guide member (111). As noted above, the rail (117) serves to helps maintain the overlay (39) in contact with the insert rails (105). Additional rails (not shown) could be placed on the outside of the openings (115) to further assist in maintaining the overlay (39) in contact with the insert rails (105).

The present invention also provides for an insert where the rails are placed along the same axis as shown in FIGS. 15 and 16, rather than parallel as shown in FIGS. 11 and 12.

FIGS. 15 and 16 show insert (121) that has two rails (125, 127) on the same general axis. The rails (125, 127) shown are of different widths to accommodate connectors. It should be understood, however, that the rails may be of the same width and may be in any suitable orientation.

Although it is preferred to use the inserts and guide members discussed above in an apparatus that stores and advances the overlay across the insert and guide member, the embodiments above may also may also be used in a stand-alone manner without the apparatus shown. In addition, in some cases it is expected that the invention may be practiced using only an insert. It is therefore not necessary to use an insert guide with an insert in order to practice the Invention.

A method for cleaning the polished end faces of fibers of an optical connectors is also provided. The method includes contacting the optical connector to a device that includes a surface with a rail disposed on the surface. The rail has a height above the surface sufficient to accommodate guide pins extending from an optical connector, whereby a recess is formed on at least one side of the rail for receiving the guide pins. An overlay is disposed on the insert the optical connector may then be removed from contact to the overlay, or preferably, may be moved along the rail to clean the optical connector on the overlay. In the foregoing method it is also expected that a guide member may be included. The guide member will have a surface with at least one opening for receiving said optical connector. The guide member may also have one or more rails extending downward from the bottom of the surface that contact the overlay. The guide member is disposed on top of the overlay such that said opening of the guide member is substantially centered around the rail of the insert below.

Although the invention has been shown and described with respect to various embodiments thereof, it should be understood by those skilled in the art that various changes, omissions, and additions may be made to the form and detail of the disclosed embodiment without departing from the spirit and scope of the invention, as recited in the following claims.

What is claimed:

1. A method for cleaning a polished end face of an optical connector, said method comprising:

placing an overlay on a device including a surface with at least one rail disposed on said surface, said rail having a height above said surface sufficient to accommodate guide pins extending from said optical connector wherein a recess is formed on at least one side of said rail for receiving at least one guide pine;

contacting said polished end face of said optical connector to said overlay and pushing said overlay onto said rail; and removing said optical connector from contact with said overlay.

2. The method of claim 1, wherein said optical connector is moved along at least a portion of said rail while said polished end face of said optical connector is in contact with said overlay.

3. The method of claim 2, wherein said optical connector is placed into a guide member with at least one opening for receiving said optical connector, wherein said guide is disposed on top of an overlay such that said rail is substantially centered in said opening.

4. A method for cleaning the polished end face of an optical connector, said method comprising:

advancing a sheet of overlay disposed on a roll is located on a surface with at least one rail disposed on said surface, said rail having a height above said surface sufficient to accommodate guide pins extending from said optical connector wherein a recess is formed on at least one side of said rail for receiving at least one guide pine;

contacting said optical connector said polished end face of to said overlay and pushing said overlay onto said rail; and removing said optical connector from contact with said overlay.

5. The method of claim 4, wherein said optical connector is moved along at least a portion of said rail while said polished end face of said optical connector is in contact with said overlay.

6. The method of claim 5, wherein said optical connector is placed into a guide member with at least one opening for receiving said optical connector on top of said overlay.

7. The method of claim 6, wherein said guide member is disposed such that the rail disposed on said insert is substantially centered in said opening of said guide member.

8. The method of claim 7, wherein said optical connector is placed into a guide member with at least one opening for receiving said optical connector on top of said overlay, and wherein said guide member is disposed such that the rail disposed on said insert is substantially centered in said opening of said guide member.

9. The method of claim 6, wherein said optical connector is inserted through a heavy density foam guide member for receiving said optical connector disposed on top of said overlay.

10. The method of claim 9, wherein said guide member is disposed such that the rail disposed on said insert is substantially centered in said opening of said guide member.

* * * * *

UNITED STATES PATENT AND TRADEMARK OFFICE
CERTIFICATE OF CORRECTION

PATENT NO. : 6,648,980 B2
DATED : November 18, 2003
INVENTOR(S) : Darrell R. Childers et al.

It is certified that error appears in the above-identified patent and that said Letters Patent is hereby corrected as shown below:

Column 9,
Line 49, delete "pine" and substitute -- pin --.

Column 10,
Line 9, add -- member -- after "guide".
Line 20, delete "pine" and substitute -- pin --.
Line 21, delete "optical connector said".
Line 22, delete "to" and add -- optical connector to said -- after the first occurrence of "said" and before the first occurrence of "overlay".

Signed and Sealed this

Third Day of February, 2004

JON W. DUDAS
*Acting Director of the United States Patent and Trademark Office*